UNITED STATES PATENT OFFICE.

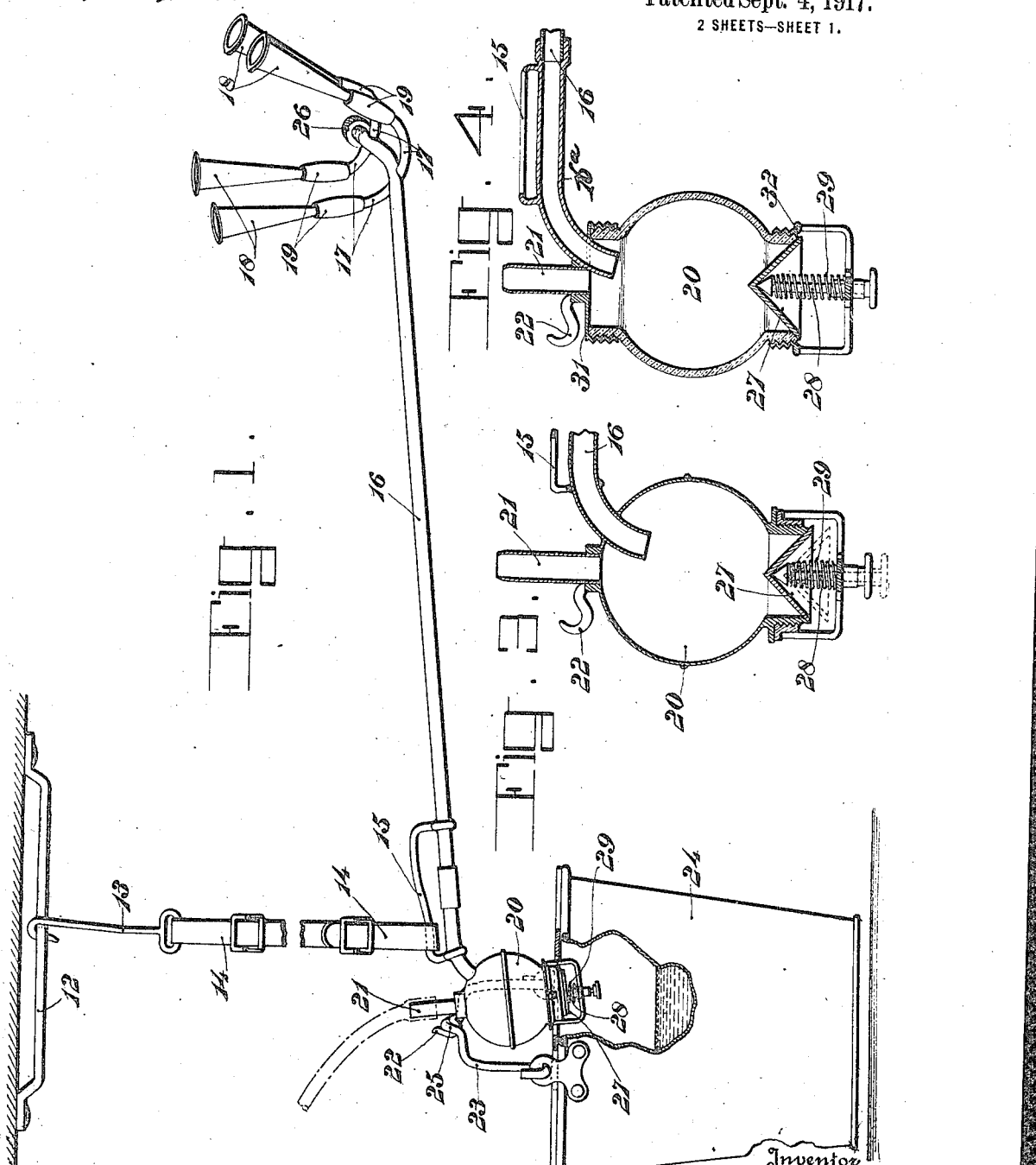

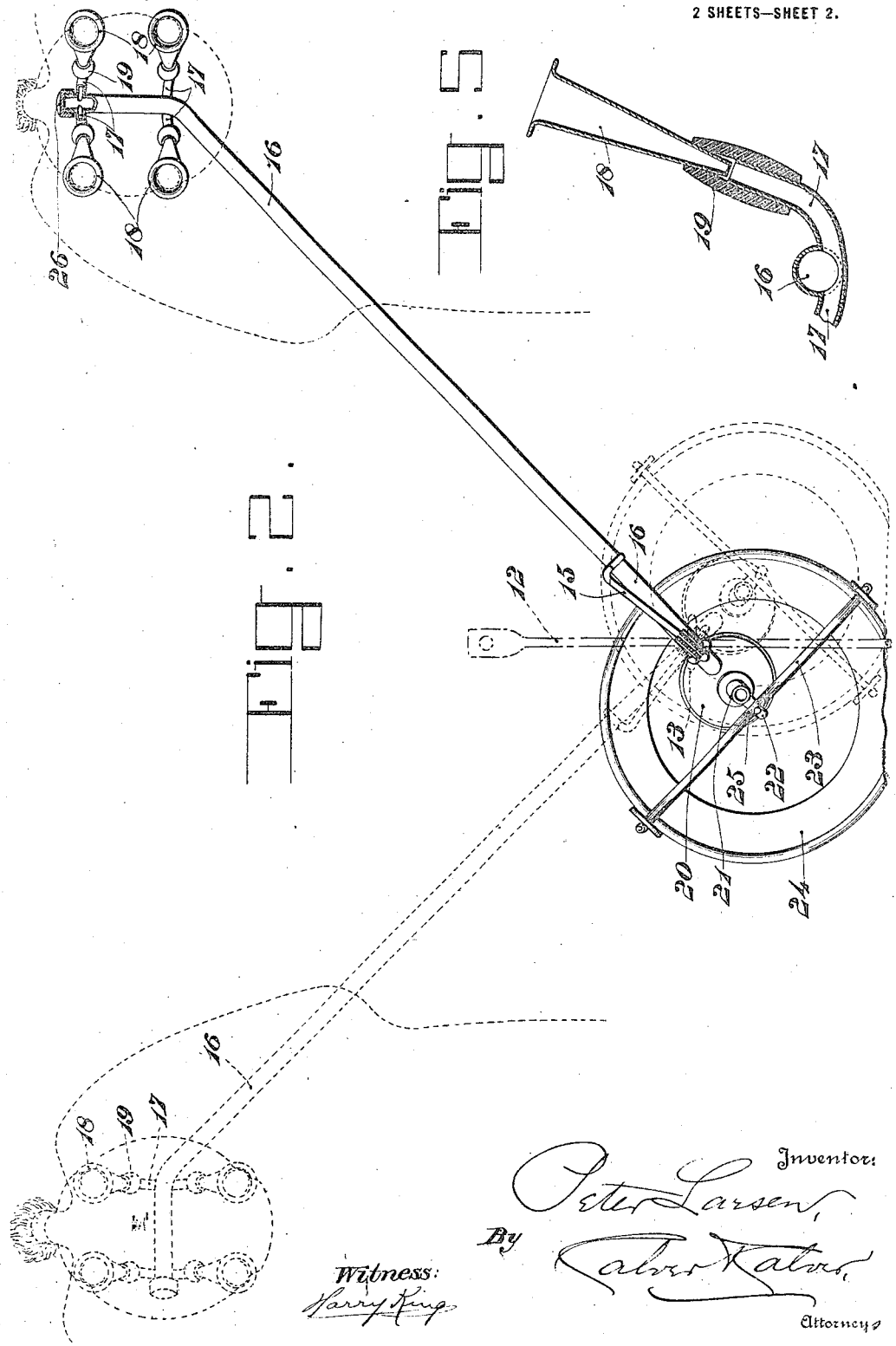

PETER LARSEN, OF CATTARAUGUS, NEW YORK.

MILKING APPARATUS.

1,239,407.  Specification of Letters Patent.  Patented Sept. 4, 1917.

Application filed February 7, 1917. Serial No. 147,151.

*To all whom it may concern:*

Be it known that I, PETER LARSEN, a citizen of the United States, residing at Cattaraugus, in the county of Cattaraugus and State of New York, have invented or discovered certain new and useful Improvements in Milking Apparatus, of which the following is a specification, reference being had therein to the accompanying drawings.

In milking machines or apparatus at present in use the teat cups are generally held in place on the teats of the animals either by straps connected with the teat cup holder and passing around the backs of the animals, or by the suction due to the air pumps employed. The use of straps is more or less inconvenient, and where straps are dispensed with and suction is depended on for holding the teat cups in place a suction so strong as to be uncomfortable to the animals is necessary; and moreover where suction is thus depended upon displacement and falling down of the teat cups sometimes occurs when the suction becomes too weak to hold them in place.

Also in the milking machines or apparatus at present in use the teat cup holders are connected with the pulsators or suction devices, which are usually mounted on the pails or milk receptacles, by means of rubber tubes, and it is difficult to keep these rubber tubes clean and in a proper sanitary condition.

My invention relates to certain improvements in milking machines or apparatus whereby the objections just above indicated will be avoided. In carrying my invention into effect the teat cup holders are connected with the suction cup or milk chamber by means of a metal intake tube which can be readily cleansed. This tube is rigidly attached to the suction cup or milk chamber, and is preferably provided with a loop for the attachment of a strap or other suitable suspending device connected at its upper end with a bar or other suitable support fastened to the ceiling or other upper part of the stalls occupied by the cows during milking. The suction cup or milk chamber is preferably provided with a hook on which the pail or milk receptacle, which is preferably provided with a cover, is suspended, so that the said pail or receptacle serves to overbalance the connecting intake tube in such a manner as to hold up the teat cups in place on the teats of the animal. The loop on the tube affords an adjustable fulcrum enabling the strap to be slipped along to different positions as the pail or milk receptacle becomes heavier, so that the upward pressure of the teat cups on the animal may not be too great, all as will hereinafter be more fully explained.

In the accompanying drawings, Figure 1 is an elevation of my improved apparatus. Fig. 2 is a plan view of the same illustrative of its use. Fig. 3 is a detail sectional view of the form of suction cup or milk chamber shown in Fig. 1. Fig. 4 shows another form of suction cup or milk chamber. Fig. 5 is a sectional view showing one of the teat cups and the parts on which it is mounted.

Referring to the drawings, 12 denotes a bar which may be attached to a ceiling or upper part of a stall where the cows are to be milked. Suspended from the bar 12, preferably by means of a hook 13, is a suspending device preferably in the form of a flexible strap 14 connected at its lower end to a loop 15 on the rigid, metal intake tube 16 provided at its end farthest from said loop with teat cup holding tubes 17 communicating with the tube 16. The hook 13 may slide along on the bar 12, should the animals move backward or forward, as they sometimes do during milking, such sliding movement of said hook accommodating the movements of the animals and preventing displacement of the teat cups by the corresponding movements of the apparatus suspended from said hook.

The tapered teat cups 18, which may be of sheet metal or other suitable material, and may be either plain or corrugated in form, are flexibly connected with the holding tubes 17 by means of short rubber tubes 19.

To prevent, so far as possible, the milk from coming in contact with the said rubber tubes 19, the entering ends of the teat cups 18 are tapered (see Fig. 5) so that the extreme inner ends thereof are not in contact with the inner walls of said short rubber tubes 19, and the latter, being very short, can be readily cleansed and may be replaced by new ones should they become cracked after long use, as is liable to occur, so that they cannot be thoroughly cleaned.

Rigidly connected to the intake tube 16 is a suction cup or milk chamber 20 provided with a tube or nozzle 21 which will be connected in the usual manner, as by a rubber tube, with a suction pump, and the said suction cup milk chamber is preferably provided with a hook 22 to engage the bail 23 of a milk-receiving pail or receptacle 24, the said bail being provided with a loop 25 so that said bail will not slide along on the said hook.

The pail or receptacle 24 thus serves as a weight to overbalance the intake tube 16 and the teat cups mounted at the opposite end of said tube, so as to hold the teat cups up in place on the teats of the animal; and the loop 15 may be slid along through the looped lower end of the strap 14, thus affording an adjustable fulcrum, so that when the pail becomes so heavy that the upward pressure of the teat cups on the animal would be too great the said loop 15 may be slid through the loop in said strap, thus lessening the upward pressure of the teat cups as the pail grows heavier with the weight of the milk. To prevent the teat cups from a tendency to tip sidewise the loop 15 is preferably inclined with reference to the intake tube 16. The loop 15 may be attached to the tube 16, or may be formed integral with or otherwise mounted on a short tube 16ª attached to the suction cup and removably connected with the tube 16.

The outer end of the intake tube 16 to which the teat cup holders are attached is inclined with reference to the body of said tube, and by virtue of this construction the said teat cups will, when the suspending device is located between and near the shoulders of two animals, be brought squarely into proper positions for successively milking the two animals, merely by swinging the said tube through an arc of about 90°, as will be understood from Fig. 2. If the teat cups were mounted on a straight part of the tube they would not come squarely into proper milking positions so as to register with the teats of the animals when the device was suspended between two animals near their shoulders.

To enable the intake tube 16 to be properly cleansed it is provided at its end adjacent to the teat cup holders with a removable cap 26 which can be taken off and a flexible spun wire brush be inserted into the said tube for the purpose of cleansing the same.

As the suction cup or milk chamber is liable to be tilted to different positions it is preferably provided with a conical self-balancing valve 27 centrally mounted on a pointed supporting pin 28 so that said valve will readily close when tilted to different angles. Said valve is pressed upward by a light spring 29 encircling the pin 28, the stress of said spring being overcome by the weight of the milk in the milk chamber, so that when the suction stroke ceases the valve will open and the milk will be discharged over the sloping walls of the valve. When the valve is thus released from the weight of the milk it will be closed, for the next suction operation, by the spring 29.

To enable the milking operation to be observed the body of the suction cup or milk chamber will preferably be of glass with molded screw threads at both ends, so that the upper and lower head portions 31 and 32 of the cup, and which heads will preferably be of metal and provided with swaged or molded screw-threaded portions for attachment to the threaded portions of the body of the cup, may be rigidly secured in place. This construction affords a ready means for detaching the parts of the suction cup or milk chamber when the same is to be cleaned.

The invention is not to be understood as being limited to all of the details herein shown, as such details may be varied widely, within the province of mechanical skill, without departing from the spirit and scope of the invention.

Having thus described my invention I claim and desire to secure by Letters Patent:—

1. In a milking apparatus, the combination with a rigid, metal intake tube, of teat cups mounted near one end of said tube, a suction cup or milk chamber mounted at the other end of said tube and provided with means for holding a pail or milk receptacle, and suspending means connected with said intake tube and affording a fulcrum whereby the weight of such pail or receptacle, with or without the milk therein, will overbalance the teat cup end of the said tube and thus serve to hold the teat cups up in milking position.

2. In a milking apparatus, the combination with a rigid, metal intake tube, of teat cups mounted near one end of said tube, a suction cup or milk chamber mounted at the other end of said tube and provided with means for holding a pail or milk receptacle, and suspending means, comprising a loop attached to said tube and a strap attached to said loop, affording a variable fulcrum whereby the weight of such pail or receptacle, with or without milk therein, will overbalance the teat cup end of the said tube and thus serve to hold the teat cups up in milking position.

3. In a milking apparatus, the combination with a rigid, metal intake tube, of teat cups mounted near one end of said tube, a suction cup or milk chamber mounted at the other end of said tube and provided with means for holding a pail or milk receptacle, and suspending means, comprising a loop attached to said tube and inclined relative thereto, and a strap attached to said loop, affording a variable fulcrum whereby the weight of such pail or receptacle, with or without milk therein, will overbalance the teat cup end of the said tube and thus serve to hold the teat cups up in milking position.

4. In a milking apparatus, the combination with a rigid, metal intake tube, of teat cups mounted near one end of said tube, a suction cup or milk chamber mounted at the other end of said tube and provided with means for holding a pail or milk receptacle, suspending means, comprising a loop attached to said tube and a strap attached to said loop, affording a variable fulcrum whereby the weight of such pail or receptacle, with or without milk therein, will overbalance the teat cup end of the said tube and thus serve to hold the teat cups up in milking position, a hook to which the upper end of said strap is connected, and a bar engaged by said hook and on which the latter may slide.

5. In a milking apparatus, the combination with a rigid, metal intake tube, of teat cups mounted near one end of said tube, a suction cup or milk chamber mounted at the other end of said tube and provided with means for holding a pail or milk receptacle, and suspending means connected with said intake tube and affording a fulcrum whereby the weight of such pail or receptacle, with or without the milk therein, will overbalance the teat cup end of the said tube and thus serve to hold the teat cups up in milking position, said tube having a bent end portion on which said teat cups are mounted.

6. A suction cup or milk chamber for milking machines consisting of a glass body portion having screw threaded ends, metal upper and lower end heads also having screw threaded portions to fit the threaded parts of said body, the upper of said heads having intake and suction tubes or parts, and the lower of said heads being equipped with a self-closing valve.

In testimony whereof I affix my signature.

PETER LARSEN.

Copies of this patent may be obtained for five cents each, by addressing the "Commissioner of Patents, Washington, D. C."